United States Patent Office 3,578,704
Patented May 11, 1971

---

3,578,704
SUCCINATES SUBSTITUTED IN THE ALPHA POSITION BY ALKYL BENZENE SULFONATES
Stephen E. McGuire and Eugene F. Kennedy, Ponca City, Okla., assignors to Continental Oil Company, Ponca City, Okla.
No Drawing. Filed Aug. 1, 1969, Ser. No. 846,928
Int. Cl. C07c *143/52*
U.S. Cl. 260—507
3 Claims

---

ABSTRACT OF THE DISCLOSURE

Novel surface active agents are provided having the general formula:

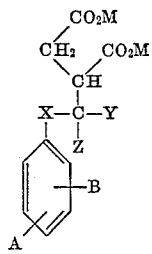

wherein X is a linear alkyl group containing from about 0 to about 35 carbon atoms, with the provision that when X contains 0 carbon atoms the phenyl nucleus is attached directly to the carbon atom bearing the succinyl group; Y is hydrogen or a linear alkyl group containing from about 1 to about 35 carbon atoms; Z is hydrogen or a linear alkyl group containing from about 1 to about 35 carbon atoms; A is hydrogen or a linear or branched alkyl group containing from about 1 to about 15 carbon atoms; M is a cation selected from the group consisting of Li, Na, K, Rb, Cs, Ca, Mg, $NH_4$ and substituted ammonium; B is hydrogen or —$SO_3M$, with M being defined as before; and the sum of the carbon atoms X, Y, Z and A being from about 8 to about 35.

---

BACKGROUND OF THE INVENTION

Field of the invention

This invention relates to surface active agents. In one aspect this invention relates to novel surface active agents containing 2 functional groups per molecule, namely, a succinate and a sulfonate moiety.

Brief description of the prior art

Alkyl benzene sulfonates, e.g., dodecylbenzene sulfonate, have been known for many years to be excellent surface active agents, as have the alkali metal salts of dicarboxylic acids, such as succinates; however, in order to obtain the benefit of the sulfonate and the alkali metal succinate groups in a composition, it has been necessary to admix two different compounds, one containing the sulfonate group and the other containing the succinate group. Thus, it would be desirable to produce a surface active agent having both the sulfonate and succinate moiety in the same molecule. Further, it would be desirable to obtain a surface active agent wherein a phenyl group and a succinate group are located randomly on the alkyl chain, while at the same time providing for a sulfonate group to be attached to the phenyl ring.

OBJECTS OF THE INVENTION

An object of the invention is to provide a novel surface active agent. Another object of the invention is to provide a surface active agent containing a succinate and sulfonate group in one molecule. Another object of the invention is to provide a surface active agent wherein the phenyl group and the succinate group are located randomly on the alkyl chain. These and other objects, advantages, and features of the present invention will become apparent to those skilled in the art from a reading of the following detailed disclosure and the appended claims.

SUMMARY OF THE INVENTION

According to the present invention novel surface active agents are provided having the general formula:

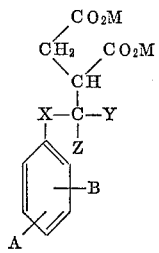

wherein X is a linear alkyl group containing from about 0 to about 35 carbon atoms, with the provision that when X contains 0 carbon atoms the phenyl nucleus is attached directly to the carbon atom bearing the succinyl group; Y is hydrogen or a linear alkyl group containing from about 1 to about 35 carbon atoms; Z is hydrogen or a linear alkyl group containing from about 1 to about 35 carbon atoms; A is hydrogen or a linear or branched alkyl group containing from about 1 to about 15 carbon atoms; M is a cation selected from the group consisting of Li, Na, K, Rb, Cs, Ca, Mg, $NH_4$ and substituted ammonium; B is hydrogen or —$SO_3M$, with M being defined as before; and the sum of the carbon atoms X, Y, Z and A being from about 8 to about 35.

DESCRIPTION OF PREFERRED EMBODIMENTS

The novel surface active agents of the present invention are those having the general formula:

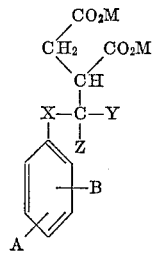

wherein X is a linear alkyl group containing from about 0 to about 35 carbon atoms, with the provision that when X contains 0 carbon atoms the phenyl nucleus is attached directly to the carbon atom bearing the succinyl groups; Y is hydrogen or a linear alkyl group containing from about 1 to about 35 carbon atoms; Z is hydrogen or a linear alkyl group containing from about 1 to about 35 carbon atoms; A is hydrogen or a linear or branched alkyl group containing from about 1 to about 15 carbon atoms; M is a cation selected from the group consisting of Li, Na, K, Rb, Cs, Ca, Mg, $NH_4$ and substituted ammonium; B is hydrogen or —$SO_3M$, with M being defined as before; and the sum of the carbon atoms X, Y, Z and A being from about 8 to about 35. Suitable substituted ammonium cations are alkyl ammonium, such as methyl ammonium, dimethyl ammonium, and the like; and alkanol ammonium, such as monoethanol, diethanol, triethanol ammonium and the like. While any combination of alkyl groups can be employed as X, Y, Z and A, the only requirement being that the sum of X, Y, Z and A be from about 8 to about 35, to provide the surface active properties of the composition, especially desirable results have been obtained wherein the sum of X, Y, Z, and A is between about 10 and 18 carbon atoms when B is hydrogen and between about 14 and 22 carbon atoms when B is a sulfonate group.

Suitable linear alkyl groups which can be employed as X in the formula described above are ethyl, propyl, butyl, pentyl, hexyl, heptyl, octyl, nonyl, decyl, dodecyl, tetradecyl, hexadecyl, octadecyl, icosyl, tetracosyl, octacosyl, nonacosyl, and triacontyl, and the like. Examples of suitable linear alkyl groups which can be employed as Y and Z are methyl, ethyl, propyl, butyl, pentyl, hexyl, heptyl, octyl, nonyl, decyl, dodecyl, tetradecyl, hexadecyl, octadecyl, icosyl, tetracosyl, octacosyl, nonacosyl, triacontyl, and the like. Examples of alkyl groups which can be employed as A are methyl, ethyl, propyl, isopropyl, butyl, isobutyl, octyl, n-dodecyl, branched dodecyl, such as that derived from propylene tetramer, tetradecyl, and the like.

The term "surface active agent" as used in this specification is a compound which lowers the surface tension of water. It is well known that such surface active agents are employed in detergent formulations and are used as wetting agents to improve the wettability of substances.

The surface active agents of the present invention can be prepared by the following synthetic route:

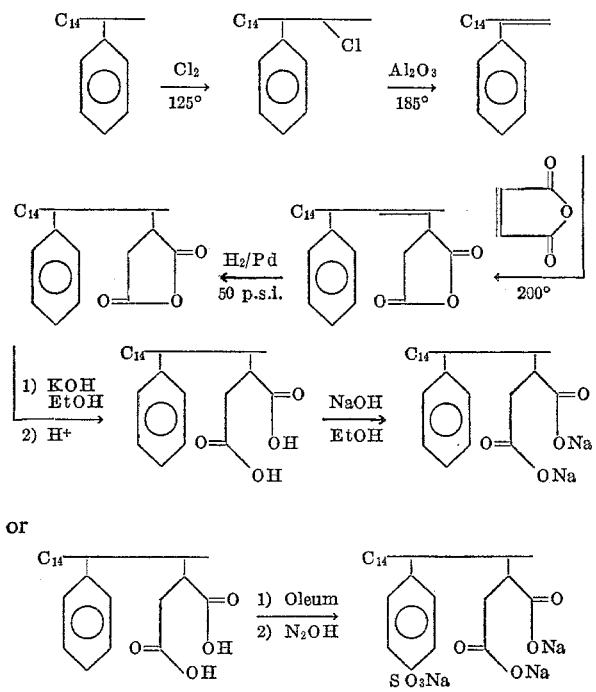

In order to more fully describe the surface active agents of the present invention the following specific examples in the preparation and utilization of the novel surface active agents of the present invention are provided. However, it is to be understood that the following examples are for illustrative purposes only and the limitations contained therein are not to be construed as unduly limiting the scope of the invention which will be defined in the claims hereinafter.

EXAMPLE I

Phenyltetradecylsuccinic acid disodium salt

Synthesis of 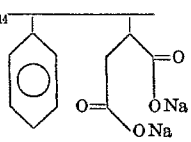

Chlorination of tetradecylbenzene.—Tetradecylbenzene (2196 g., 8 moles) was placed in a flask fitted with condenser, thermometer, mechanical stirrer, and sintered glass bubbler. It was heated to 125° C. and chlorine gas (~114 g., ~1.6 moles) was introduced over a 30-minute period through a calibrated flow meter. Then, the solution was cooled and nitrogen was purged through the system to remove HCl and $Cl_2$. Weight increase after chlorination was 49 g. This corresponds to ~25% chlorination.

Dehydrohalogenation of side-chain chlorinated tetradecylbenzene.—The chlorinated tetradecylbenzene (2245 g., ~25% chlorinated) was placed in a flask fitted with condenser, thermometer, mechanical stirrer, and sintered glass bubbler. Ten grams of activated alumina, was added and the reactants were warmed to 185–190° C. After 4½ hours this was increased to 230°. Nitrogen was purged through the bubbler to remove hydrogen chloride as it formed. The dehydrohalogenation was followed by X-ray fluorescence by observing the decrease in weight percent chlorine.

| Time, hrs. | w/o Cl | Percent Dehydrohalogenation |
|---|---|---|
| 0 | 2.40 | 0 |
| 3 | 1.06 | 55 |
| 5½ | 0.52 | 78 |
| 21½ | 0.27 | 90 |

After 21½ hours, the reactants were cooled to 100° C. and 15 g. of charcoal was added, slowly cooled to room temperature with stirring and filtered through HyFlo.

Condensation of tetradecenylbenzene with maleic anhydride.—Powdered maleic anhydride (88.2 g., 0.9 mole), the olefin-arene mixture (1255 g., ~0.9 mole olefin), and 300 ml. o-dichlorobenzene were placed in a flask fitted with thermometer and condenser with drying tube. This was heated to 190–195° C. for 40 hours. It was then cooled to room temperature and rigged for vacuum distillation through a six-inch column. All the material boiling up to 165°/3 mm. was stripped off. This left 156 g. of dark viscous oil in the pot.

Hydrogenation of the tetradecylbenzene-maleic anhydride condensation product.—Forty grams of tetradecenylbenzene-maleic anhydride condensation product was dissolved in ~200 ml. of F-30 ethanol. This was poured onto 1.5 g. of 10% palladium on powdered charcoal in 300 ml. autoclave. Run at 50 p.s.i. for 23 hours. At this time the catalyst was filtered off and the autoclave charged with 1.5 g. of fresh catalyst. The hydrogenation was then continued an additional 18 hours at 50 p.s.i. The catalyst was then filtered off.

Hydrolysis of 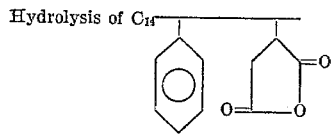

Potassium hydroxide (63.5 g., 85% by weight) was added to the anhydride from above (105 g. in 700 ml. F-30 alcohol). As the KOH dissolved, the contents warmed slightly and the color darkened. The solution was then heated to reflux for 2 hours; then almost all of the alcohol was removed by simple distillation, cooled slightly and 350 ml. of water added. The homogeneous solution was acidified with 50% HCl to yield an oil layer. Seven hundred milliliters of water and 300 ml. of carbon tetrachloride were added and the mixture was stirred well. The organic phase was separated and solvent removed by evaporation to leave 114 g. of dark-amber oil.

Analytical results: Infrared confirmed conversion of cyclic anhydride to carboxylic acid. NMR confirmed about 91% of diacid based on the ratio of exchangeable protons to aromatic protons. NMR also found ~5% olefin.

Preparation of phenyltetradecylsuccinic acid disodium salt.—Phenyltetradecylsuccinic acid (51.0 g., 0.131 mole) was dissolved in 300 ml. of F-30 alcohol by heating on a hot plate. Then 10.5 g. (0.262 mole) of sodium hydroxide in 25 ml. of water was added. The solution, with pH 9–10 by pHydrion paper, was placed on a steam bath overnight to remove solvent. Finally dried in a vacuum oven at 60–70° C. using house vacuum. This was ground up to yield 52 g. of light-brown powder. The powder was analyzed by NMR and acid-base titration and determined to be phenyltetradecylsuccinic acid disodium salt.

EXAMPLE II

Sulfophenyltetradecylsuccinic acid trisodium salt

Synthesis of $C_{14}$

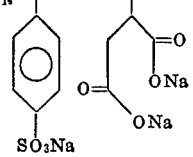

Sulfonation of phenyltetradecylsuccinic acid.—It was necessary to dissolve the carboxylic acid by warming in 250 ml. of acid washed n-hexane. The sulfonation was carried out at 50° C. Forty-seven grams of phenyltetradecylsuccinic acid (0.12 mole) and 50 g. of oleum were used. After sulfonation, the reaction mass was neutralized with sodium hydroxide in 50% isopropyl alcohol. The pH was then carefully lowered to three with 0.1 N $H_2SO_4$. The solution was extracted with 500 ml. of hexane and produced 3.5 g. of unsulfonated oil. The alcohol-water solution was then warmed to 65–70° C. and saturated with $Na_2CO_3$. The alcohol phase was isolated and solvent evaporated to yield 38.1 g. of light-brown powder. The powder was analyzed by NMR and acid-base titration and determined to be sulfophenyltetradecylsuccinic acid trisodium salt.

EXAMPLE III

Two compounds were tested for their effect on the surface tension of water.

(1) 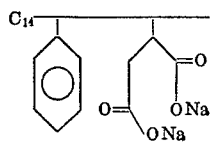

(2) 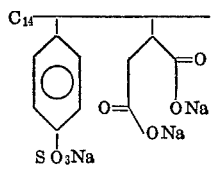

The results were:

| Sample Number: | Surface tension (dynes/cm.) | |
|---|---|---|
| | 0.1% solution | 1.0% solution |
| 1 | 50.9 | 37.2 |
| 2 | 38.5 | 33.7 |

As can be seen, these are depressed far below the 72 dynes/cm. surface tension of water. These compounds are indeed surface active.

The data above in Examples I and II clearly indicate that the novel surface active compounds of the present invention which contained a sulfonate group attached to the phenyl ring and a succinate group attached to the linear alkyl group of the formula previously described can readily be prepared. Further, it is readily apparent that by incorporating both the succinate group and the sulfonate group into the same molecule that one can obtain surface active agents, the utility of which are well known to those skilled in the art. Example III shows the effect the novel surface active agents have on the surface tension of water.

Having thus described the invention, we claim:

1. A compound having the formula:

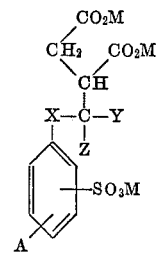

wherein X is 0 or a linear alkyl group containing from about 1 to about 35 carbon atoms, with the provision that when X is 0 the phenyl nucleus is attached directly to the carbon atom bearing the succinyl group; Y is hydrogen or a linear alkyl group containing from about 1 to about 35 carbon atoms; Z is hydrogen or a linear alkyl group containing from about 1 to about 35 carbon atoms; A is hydrogen or a linear or branched alkyl group containing from about 1 to about 15 carbon atoms; M is a cation selected from the group consisting of Li, Na, K, Rb, Cs, Ca, Mg, $NH_4$ and substituted ammonium; and the sum of the carbon atoms X, Y, Z and A being from about 8 to about 35.

2. The surface active agent of claim 1 wherein B is a sulfonate group and the sum of X, Y, Z and A is from about 14 to about 22.

3. The surface active agent of claim 1 wherein said compound has the formula:

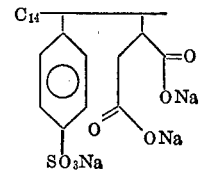

References Cited

UNITED STATES PATENTS 2,763,680   9/1956   Sallmann _____ 260—507

DANIEL D. HORWITZ, Primary Examiner

U.S. Cl. X.R.

260—515